3,198,554
COMBINATION WASTE AND VENT FITTING FOR WALL HUNG WATER CLOSET
William I. Hartshorn, Jr., Los Angeles, Calif.
(Rte. 4, Box 448, Grants Pass, Oreg.)
Filed June 26, 1961, Ser. No. 119,596
1 Claim. (Cl. 285—64)

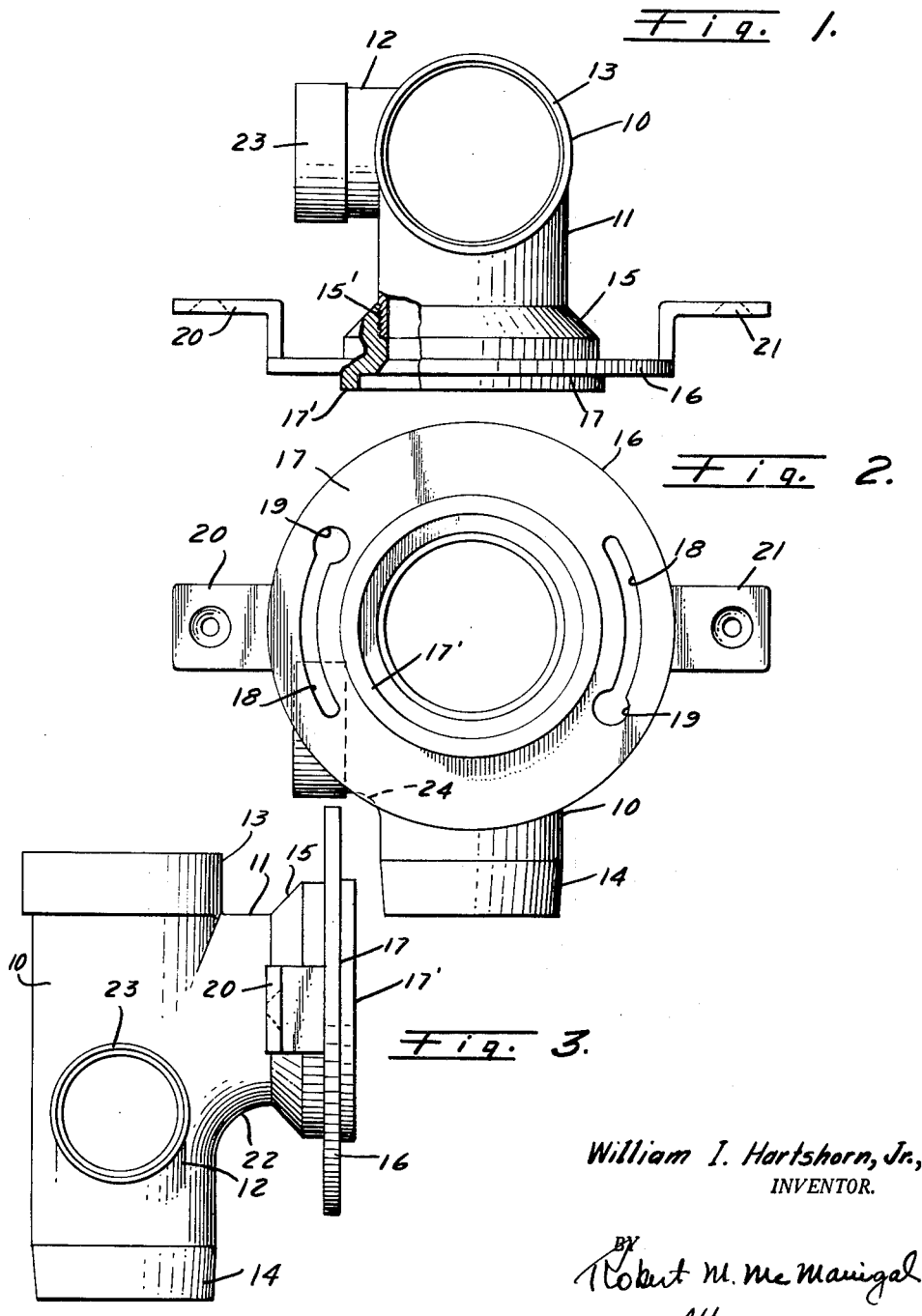

The present invention relates generally to pipe connectors, and is more particularly concerned with a combination plumbing fitting of such construction as to more economically permit the installation of a wall hung water closet.

Heretofore the installation of a wall hung water closet presented a problem for the reason that the space within which fittings might be mounted was extremely limited, and due to the fact that the piping necessitated the use of separate fittings, nipples, etc. which required makeshift and uneconomical arrangements.

Having the foregoing in mind, the present invention has for an object the provision of an improved combination plumbing fitting which may be installed in a building wall structure during roughing in, and which will subsequently form a support for a wall hung water closet, this fitting being so arranged as to occupy a small space and provide the necessary vent and main drain connections, together with one or more additional waste connections, where necessary.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a top plan view of a fitting embodying the features of the present invention;

FIG. 2 is a front elevational view looking towards the water closet mounting flange; and FIG. 3 is a side view of the same.

Referring more specifically to the drawings, the fitting of the present invention is illustrated as comprising a composite tubular connector having a main straight tubular part 10 with integrally formed tubular branch portions 11 and 12 communicating therewith between its ends. The fitting of the present invention may be constructed of brass, bronze, copper or other suitable materials to meet particular requirements.

More specifically, the fitting is arranged to be mounted in a position of use in which the main part 10 will be vertically disposed. The part 10 is adapted at its ends for connection with associated pipes, and is shown as having its uppermost end arranged to provide a female slip joint connection 13 permitting this end of the fitting to be connected to a main vent. The lowermost end of this part is provided with a tapered male slip joint connection 14 to facilitate connection of the fitting to a main drain.

The branch connection 11 is physically positioned more closely to the end connection 13 and extends from the main tubular part in such a direction that its axis will be at right angles to the longitudinal axis of the main tubular part.

At its outermost end, the connection 11 is adjustably secured to an annular member 15 by means of interengaging threads 15'. This annular member carries an integrally formed radially extending flange 16 which presents an annular outer seating face 17 having a projecting annular flange 17' which cooperates with the seating face 17 for sealing engagement with a complementary mounting part of a wall hung type of water closet. The water closet is secured in mounted position by means of anchor bolts which may be fitted into arcuate slots 18 formed in the radially extending flange 16, these slots having enlarged entrance openings 19 at one end thereof.

The threaded connection between the annular member 15 and the branch connection 11 provides for adjustability during installation, and further facilitates the positioning of mounting lugs 20 and 21 diametrically disposed on opposite sides of the flange 16, these lugs being rearwardly offset with respect to the seating face 17. As best shown in FIG. 3, the branch connection 11 has a curved wall 22 so as to form a sanitary sweep where it joins the main tubular part 10.

The branch connection 12 is shown as having an axis which is normal to the longitudinal axis of the main tubular part, but which is in right angled relation to the axis of the branch connection 11. Also it will be seen that the axis of the branch 12 is displaced below the axis of the branch 11. The outermost end of the branch connection 12 is shown as being provided with a female slip joint connection 23 to permit its connection to an incoming waste line. The branch connection 12 is similarly provided with a curved wall 24, as best shown in FIG. 2, to provide a sanitary sweep at the jointure of this branch with the main tubular part.

While the description and drawings have disclosed a fitting which embodies a single branch connection with water closet mounting flange and a single incoming waste connection, it is within the broad concept of the present invention that the fitting may embody additional branches of the character described without departing from the invention disclosed herein.

Various modifications may suggest themselves to those skilled in the art without departing from the spirit of my invention, and, hence, I do not wish to be restricted to the specific forms shown or uses mentioned, except to the extent indicated in the appended claim.

I claim:

A plumbing fitting for a wall hung water socket, comprising: a main tubular part arranged to be vertically positioned in use; an integrally formed tubular branch communicating with said main part between its ends through a sanitary sweep, and having an axis extending at right angles to the axis of said main part; an end flange at the outermost end of said branch connection presenting an annular seating face, said end flange having diametrically positioned radially extending mounting lugs on opposite sides, said lugs projecting beyond the flange periphery and respectively having outer end portions rearwardly offset with respect to said flange; and diametrically positioned arcuate bolt receiving slots in said seating face concentric to the axis of said tubular branch, said slots permitting adjustable positioning of the bolts therein circumferentially of said axis.

References Cited by the Examiner

UNITED STATES PATENTS

| | | | |
|---|---|---|---|
| 583,252 | 5/97 | Dresser | 285—412 |
| 1,093,626 | 4/14 | Hulbert | 285—150 |
| 1,132,953 | 3/15 | Mann | 4—252 |
| 1,155,498 | 10/15 | Lloyd | 4—252 |
| 1,689,510 | 10/28 | Wackman | 285—202 |
| 3,012,252 | 12/61 | Gaddy | 4—252 |

FOREIGN PATENTS 618,050   4/61   Canada.

CARL W. TOMLIN, *Primary Examiner.*